United States Patent [19]

Hellquist et al.

[11] Patent Number: 4,887,638
[45] Date of Patent: Dec. 19, 1989

[54] REGULATOR

[75] Inventors: Ivan Hellquist, Sollentuna; Pierre Bühlmann, Lidingö, both of Sweden

[73] Assignee: Interspiro AB, Lidingo, Sweden

[21] Appl. No.: 241,108

[22] Filed: Aug. 11, 1988

[30] Foreign Application Priority Data

Aug. 11, 1987 [SE] Sweden ................. 8703117

[51] Int. Cl.⁴ ........................................... G05D 16/06
[52] U.S. Cl. .......................... 137/505.13; 137/505.28; 137/508; 137/557
[58] Field of Search ...................... 137/505.25, 505.13, 137/505.47, 508, 557, 505.28

[56] References Cited

U.S. PATENT DOCUMENTS

| | | | |
|---|---|---|---|
| 2,855,950 | 10/1958 | Phillips | 137/505.28 |
| 2,888,949 | 6/1959 | Evans | 137/505.25 |
| 3,012,751 | 12/1961 | Hauser | 251/60 |
| 3,207,175 | 9/1965 | Pauly | 137/505.46 |
| 3,211,175 | 10/1965 | Replogle | 137/505.28 X |
| 3,437,109 | 4/1969 | Carlson et al. | 137/505.25 |
| 3,512,550 | 5/1970 | Ammann | 251/60 X |
| 3,785,333 | 1/1974 | Warncke et al. | 137/557 X |
| 3,788,312 | 1/1974 | Sandstrom . | |
| 3,910,222 | 10/1975 | Metivier | 137/557 |
| 4,250,876 | 2/1981 | Kranz . | |

FOREIGN PATENT DOCUMENTS 57533 4/1936 Norway ......................... 137/557
1531768 11/1978 United Kingdom .

Primary Examiner—Stephen M. Hepperle
Attorney, Agent, or Firm—Pollock, Vande Sande & Priddy

[57] ABSTRACT

A pressure regulator has a first and a second chamber which are separated by a movable piston varying the size of the chambers and which are in fluid contact with one another through a channel extending in the movable piston. The piston has a greater pressure surface area in the first chamber than in the second chamber. A high-pressure chamber beneath the bottom of the second chamber, has an aperture disposed in the bottom of the second chamber. A valve seat is disposed in the second chamber and cooperates with the movable piston to form a throttle between the high-pressure chamber and the second chamber. A high-pressure piston disposed in the high-pressure chamber projects into the second chamber through the first aperture and is displaceable in its longitudinal direction therethrough. A second aperture is provided at the end of the high-pressure piston which faces the second chamber. Also, a channel in the high-pressure piston extends from the second aperture throughout the entire high-pressure piston. The regulator may include a warning device. It may also be used to ensure a constant gas flow to, for example, an emergency escape breathing apparatus.

29 Claims, 4 Drawing Sheets

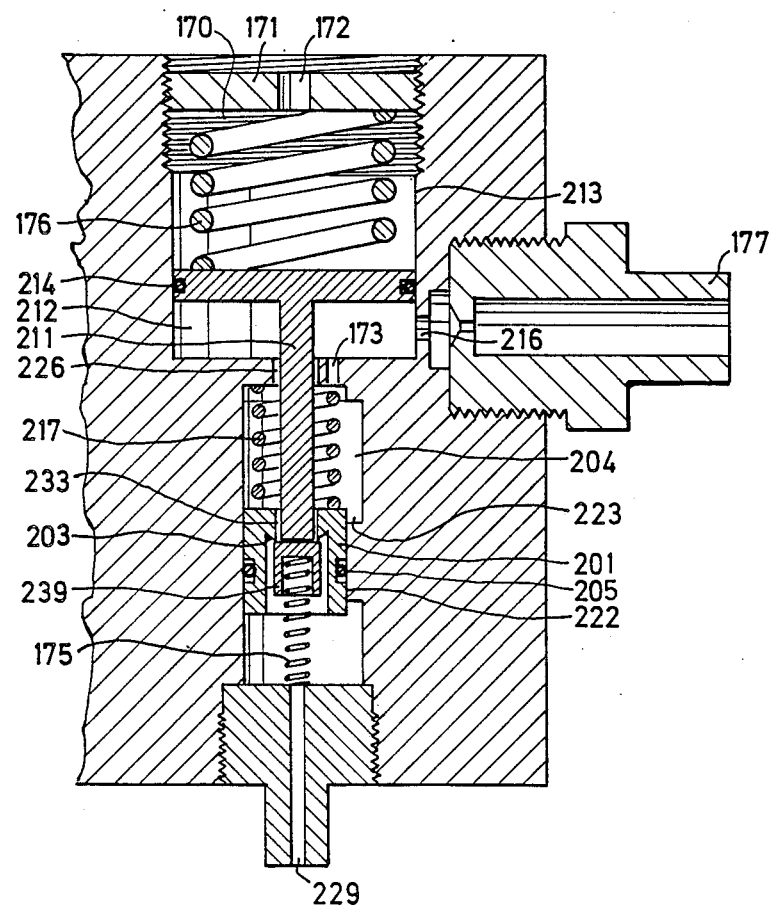

4,887,638

REGULATOR

TECHNICAL FIELD

The present invention relates to a pressure regulator with a first and a second chamber which are separated by a movable piston varying the sizes of the chambers, and are in fluid contact with one another by the intermediary of a channel; with a high-pressure chamber under the bottom of the second chamber; with an aperture disposed in the bottom of the second chamber; and with a valve seat disposed in the second chamber and cooperating with the piston, the piston and the valve seat, or a sealing member cooperating with the seat, and the seat together forming a throttle between the high pressure chamber and the second chamber.

BACKGROUND ART

According to the stipulations which apply for breathing apparatus with a carried gas supply, as a rule air at a pressure of at most 300 bar, there must be provided a warning device which tells the user when a predetermined volume of breathing gas remains at his disposal. This predetermined volume of gas normally corresponds to 20 percent of the maximum filling pressure of the gas store.

Such warning signals are generated, for example, by a whistle which is automatically activated when the pressure in the gas supply has fallen to the predetermined level. Depending upon the type of the breathing apparatus and the gas supply, and upon the stipulations regulations applicable in the user's country, the actuation value of the warning signal may vary between 30 and 75 bar, within which pressure range the signal or warning apparatus should be actuable. In order to obtain the correct aspiration flow to the whistle, gas is supplied through a nozzle which is connected to a pressure regulator.

Such a regulator may consist of a first regulation stage in the breathing conduit of the apparatus, or of a specific pressure regulator which is included in the signal apparatus and is connected with direct gas supply from the gas source.

The gas flow which is consumed for making the signal may, for example according to the CEN standards, not exceed 5 liters per minute on average throughout the entire time when the pressure in the gas supply falls from the actuation value towards zero. With prior-art regulators, there will be obtained a gas volume consumed by the whistle which increases—normally linearly—as the pressure falls in the gas supply from the actuation value towards zero.

SUMMARY OF THE PRESENT INVENTION

One object of the present invention is to realize a regulator which provides a constant secondary pressure throughout the entire range from actuation pressure and to substantially zero.

A second object of the present invention is to devise a regulator with a distinct activation which may be adjustable within broad limits and maintains gas consumption constant throughout the entire adjustment range.

Yet a further object of the present invention is to realize a regulator which forms a constant flow device throughout the entire range from maximum primary pressure in the gas supply to substantially zero.

These objects will be attained by a regulator according to the present invention in which a high pressure piston disposed in the high pressure chamber, the piston protruding into the second chamber through the aperture and being displaceable in its longitudinal direction therethrough; a second aperture in the end of the high-pressure piston positioned to face the second chamber, in which second aperture the valve seat is disposed; a fluid communication in the high-pressure chamber between the second aperture and the outside of the piston in the high-pressure chamber; first spring means which urge the high-pressure piston towards the bottom of the high pressure chamber; and second spring means which urge the first piston in a direction away from the valve seat.

Advantageous and preferred embodiments of the present invention will be apparent from the following description.

DESCRIPTION OF THE ACCOMPANYING DRAWINGS

The nature of the present invention and its aspects will be more readily understood from the following brief description of the accompanying Drawings and the description relating thereto.

In the accompanying Drawings:

FIG. 4 shows yet another embodiment of the regulator according to the present invention in cross-section.

DESCRIPTION OF PREFERRED EMBODIMENT

Figure 1:
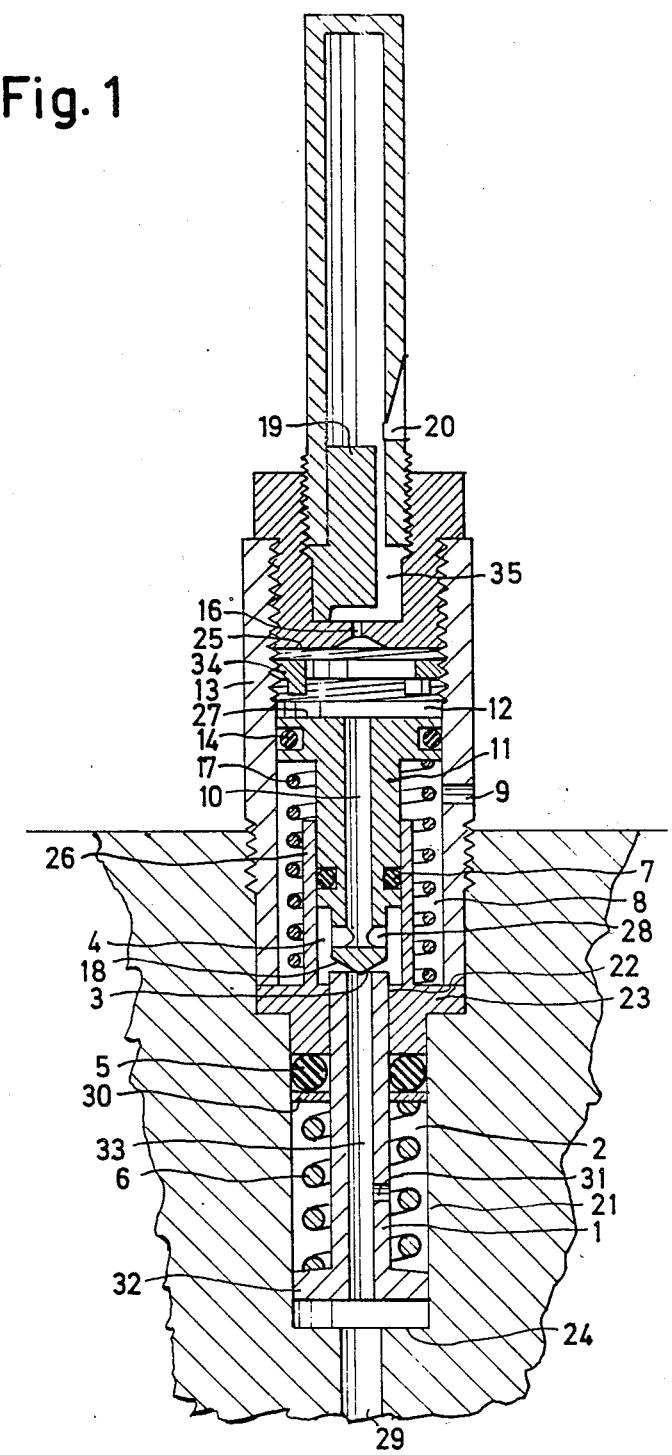
FIG. 1 shows one preferred embodiment of the regulator according to the present invention in cross-section.

Referring to the Drawings, the regulator of FIG. 1 comprises a cavity which is defined by a cylindrical casing 13 with an upper defining wall 25 and a bottom 23 provided with an aperture 22. From the bottom 23, there departs a fistular member 26 of greater inside diameter than the aperture 22. A piston 11 is disposed in the cavity, an upper portion of the piston 11 slidably abutting against the inner surface of the casing 13, an intermediate portion slidably abutting against the inner surface of the fistular member 26 and a lower portion being located in spaced-apart relationship from the inner surface of the member 26. The piston 11 divides the cavity into an upper or first chamber 12 which is defined by the wall 25, the casing 13 and the upper defining surface 27 of the piston 11, and a second chamber 4 which is defined by the bottom 23, the fistular member 26 and the lower portion of the piston 11.

The piston 11 is provided with a central channel 10 which extends from the upper defining surface 27 thereof through the upper and intermediate regions of the piston and into the lower region thereof, in which the channel 10 merges into at least one radial channel 28 which places the channel 10 in communication with the second chamber 4. Hence, the first chamber 12 is, by the intermediary of the channel 10 and the channel 28, in fluid contact with the second chamber 4. At its upper region, the piston 11 is provided with a seal 14 which sealingly abuts against the casing 13, and in its intermediate portion is provided with a seal 7 which sealingly abuts against the inner surface of the fistular member 26.

The cavity enclosed by the casing 13 also includes a third chamber 8 which is defined by the casing 13, the bottom 23, the outer surface of the fistular member 26 and the piston 11. A second spring member 17 is disposed in the chamber 8, this spring member being, for instance, a steel spring or gas spring and urging the piston 11 in a direction towards the upper defining wall 25 of the first chamber 12. The chamber 8 is, through an aperture 9 in the casing 13, in fluid communication with the ambient atmosphere.

A high-pressure chamber 2 is disposed beneath the bottom 23 of the second chamber 4. The high-pressure chamber 2 is defined by a cylindrical casing 21 with a bottom 24, and by the bottom 23 of the second chamber. The high-pressure chamber 2 is connectable, through an aperture 29, to a source of breathing gas (not shown). A second piston 1 is disposed in the high-pressure chamber 2, this high-pressure piston 1 extending from the bottom 23 of the chamber 2 through the aperture 22 into the bottom 23 of the second chamber 4 and into the second chamber 4 proper. The upper portion of the piston 1 is of such outer diameter as to be displaceable along the defining wall of the aperture 22. The lower portion of the piston 1 most proximal the bottom 24 is designed as a collar 32 whose cylindrical portion is slidable along the casing 21. A seal 5 is disposed between the bottom 23 and a washer-like member 30, the member 30 being urged against the seal 5 by a first spring member 6, for example a steel or gas spring, with predetermined force.

At its upper end projecting into the second chamber 4, the piston 1 is provided with an opening which forms a valve seat 3 for the first piston 11 whose lower region forms a cylindrical body with a conical tip 18. The conical tip 18 of the piston 11 cooperates with the valve seat 3 and forms a throttle device 3, 18. The aperture of the piston 1 at the seat 3 merges into a channel 33 which extends throughout the entire piston 1. A channel 31 communicates the channel 33 with a spring housing which is defined by the casing 21, the piston 1 and the member 30, as well as the seal 5. The seal 5, which has low friction against the surface of the high-pressure piston 1, tightly separates the spring housing from the second chamber 4 such that the high pressure piston 1 may, by gas cylinder pressure, hereinafter designated primary pressure, be displaced in a direction towards the second chamber 4 when the difference between the primary pressure and the pressure in the chamber 4 is of a sufficient degree to overcome the pretensioning of the spring 6. It is not necessary that the channel 33 reach the lower defining surface of the piston 1. Instead it may extend as far down in the piston that it is, by the intermediary of the channel 31, in communication with the spring housing. The position of the channel 31 in the piston 1 should be such that, on upward displacement of the piston 1, the channel 31 is always located beneath the member 30.

In the first chamber 12, there is provided an arrest member 34 which defines the upward movement of the piston 11. An arrest for the upward movement of the piston 11 may also be constituted by the upper defining wall 25. The arrest for the upward movement of the piston 11 is variable.

The upper defining wall 25 of the chamber 12 is, in the illustrated embodiment, integral with a warning device in the form of a whistle 19. Above the chamber 12 and separated by the wall 25, there is a chamber 35 which, by the intermediary of a nozzle 16, is in fluid communication with the first chamber 12. The whistle 19 is connected to the chamber 35 with its signal opening 20. A conduit (not shown) to a breathing apparatus, for example an emergency evacuation, or escape apparatus, may be connected instead of the whistle 19. The breathing apparatus may then, with the assistance of the nozzle 16, be provided with a constant flow of breathing gas.

ACTIVATION PHASE

On employment of the regulator, gas is caused to flow from a gas bottle into the high-pressure chamber 2 through the aperture 29. The gas flows through the channel 31 and between the collar 32 and the wall of the chamber out into the spring housing. The gas flowing through the valve seat 3 and entering into the second chamber 4 builds up a pressure which initially is equal to the primary pressure and which, through the channel 28 and 10 in the first piston 11, propagates to the first chamber 12. From the chamber 12, the gas flows through the nozzle 16 into the chamber 35 and thereafter through the warning device 19. The control spring 17 holds the first piston 11 against the arrest member 34 or the wall 25 if this constitutes the arrest member for the upward movement of the piston 11. Since the defining wall 25 integral with the warning device 19, or the arrest 34, is threaded into the casing 13, the arrest is adjustable, which, as will be demonstrated in the following disclosure, is employed to select that primary pressure at which the gas flow to the warning device 19 is to be shut off when the primary pressure increases, and thereafter be engaged when the primary pressure falls.

The valve seat 3 and the tip 18 of the first piston 11 form a throttle which in this position is completely open, but, when the pressure in the chamber 12 against the working surface of the first piston 11 overcomes the force of the second spring 17, displaces the first piston 11 with the tip 18 towards the valve seat 3 and throttles the gas flow from the high-pressure chamber 2.

REGULATION PHASE 1

The first piston 11 with the spring 17 and the throttle valve 3, 18 now act as a pressure regulator which limits the pressure in the second and first chamber 4 and 12, respectively, to a level which is determined by the equilibrium between, on the one hand, the force of the spring 17 and the primary pressure against the tip 18, and, on the other hand, by the pressure in the chamber 12 against the working surface of the first piston 11.

Since the force against the tip 18 increases with increasing primary pressure P1, the secondary pressure P2 in the chamber 12 will not be fully constant but will receive an addition $dP2 = k \times dP1$, wherein k is the relationship between the pressure-absorbing area of the tip 18 and the working area of the first piston 11. The high-pressure piston 1 lies firmly against the bottom 24 of the high-pressure chamber 2 only as long as the pressure difference P1−P2 is not capable of overcoming the tensioning of the spring member 6.

REGULATION PHASE 2

When the pressure P1 has risen to such an extent that the pressure difference P1−P2 overcomes the tensioning of the spring 6 the second piston 1, and thereby also the first piston 11, will begin to be displaced in a direction towards the arrest device 34. It should be observed that the tip 18 is influenced solely by the pressure difference P1−P2 and, hence, does not come into contact with the valve seat 3.

When the primary pressure P1 further increases, the pistons 1 and 11 are displaced, linearly with the pressure increase, a distance which is determined by the size of the pressure increase, the working area of the second piston 1 (which is the difference between the area of the aperture 22 and the area of the channel 33 at the valve seat 3) and the spring constant of the spring member 6.

In this instance, the pressure regulator is still functioning as described above under "Regulation phase 1", but with that difference that the pretensioned length of the second spring increases by the same distance as the pistons 1 and 11 have moved, and that thereby the force of the second spring 17 against the first piston 11 has decreased linearly with the primary pressure increase. This pressure reduction is, however, counteracted by the fact that the first piston 11 simultaneously receives additional force in that the same primary pressure increase acts against the pressure area of the tip 18.

In the regulator of the present embodiment, the pressure area of the valve seat 3 has been adapted to piston areas and spring constants such that the reduction of force of the regulating spring 17 is fully counterbalanced by the above-mentioned additional force. As a result, the pressure regulator will have a constant secondary pressure, and the nozzle 16 a constant flow as a function of the primary pressure under regulation phase 2.

By over- or under-compensating the force reduction of the second spring 17, it is also possible to realize an increasing, or reducing, secondary pressure characteristic, respectively.

DEACTIVATION AND ACTIVATION

As has been described in the foregoing, the pistons 1 and 11 are displaced a distance which is linear with increasing primary pressure, as soon as the prestressing of the spring 6 has been overcome by the second piston 1 at a quite low primary pressure. When the primary pressure has increased to such an extent that the pistons 1 and 11 have been displaced until such time that the first piston 11 comes into contact with the arrest 34, the positions of the first piston 11 and the tip 18 are fixed such that the valve seat 3 in the second piston 1 is urged against the tip 18 when the primary pressure continues to increase, in which event the gas flow to the warning device 19 is shut off.

Since the second chamber 4 will be depressurized, the pressure difference across the high-pressure piston 1 will be amplified, with the result that shut-off is effected distinctly. When the primary pressure increases to its final level, normally at a maximum of 300 bar, the contact pressure in the throttle device 3, 18 will greatly increase.

When the contents of the gas bottle are consumed and the primary pressure has fallen to that value at which contact pressure is once again zero, the second chamber 4 is placed under a pressure such that, conversely, the throttle valve 3, 18 distinctly opens, whereafter the pressure regulator begins to operate in regulation phase 2 and a gas flow is once again supplied to the warning device 19. Since the secondary pressure, when the remainder of the contents in the gas bottle have been consumed, is held constant during regulation phase 2 and almost constant during regulation phase 1, the warning device 19 will sound at full strength until such time as the secondary pressure is equal to the primary pressure, whereafter the signal fades in strength and finally ceases altogether.

Since the deactivation occurs when the second chamber 4 is under pressure and activation when it is depressurized, that is at different pressure differences across the high-pressure piston 1, activation will occur at a lower primary pressure than deactivation. The difference is at least equal to the secondary pressure, for example 7 bar. In practice, the difference is approximately 15 bar, since frictional forces in opposing directions on deactivation and activation, respectively, come into play.

Adjustment of the regulator is effected with respect to activation. In dimensioning, the spring constant and pretensioning of the spring 6 are first determined, which gives the high-pressure piston 1 an adjustably acceptable stroke length, for example 2.5 mm, between highest and lowest activation pressure, for example 80 bar and 20 bar, respectively. Thereafter, the remaining dimensions are calculated.

In the employment of the regulator according to the present invention as a constant flow device which is to supply a breathing apparatus, for example an emergency evacuation apparatus, with a constant flow of breathing gas, the arrest 34 is disposed at such spaced-apart relationship from the position of the first piston 11 that the piston 11 will not come into contact with the arrest 34 even when the highest possible primary pressure acts upon the high-pressure piston 1. The spring constants of the springs and the working surfaces of the pistons in the regulator are dimensioned in such a manner, like the nozzle 16, as to obtain a predetermined constant flow through the nozzle 16 when the secondary pressure in the chamber 12 (at a given primary pressure) has reached a predetermined level. The regulator thus operates according to regulation phase 2 from this given level to maximum operating pressure, and vice versa. When the throttle device 3, 18 in the regulator according to the present invention is closed at a high primary pressure, the secondary pressure is zero. When the primary pressure has reached a predetermined level, the throttle device is opened distinctly and a secondary pressure is obtained in the chamber 12, this pressure being constant with fading primary pressure, and the gas volume delivered through the nozzle 16 is constant and selectable, for example at, at most, 5 liters per minute.

DESCRIPTION OF ALTERNATE EMBODIENTS

Figure 2:
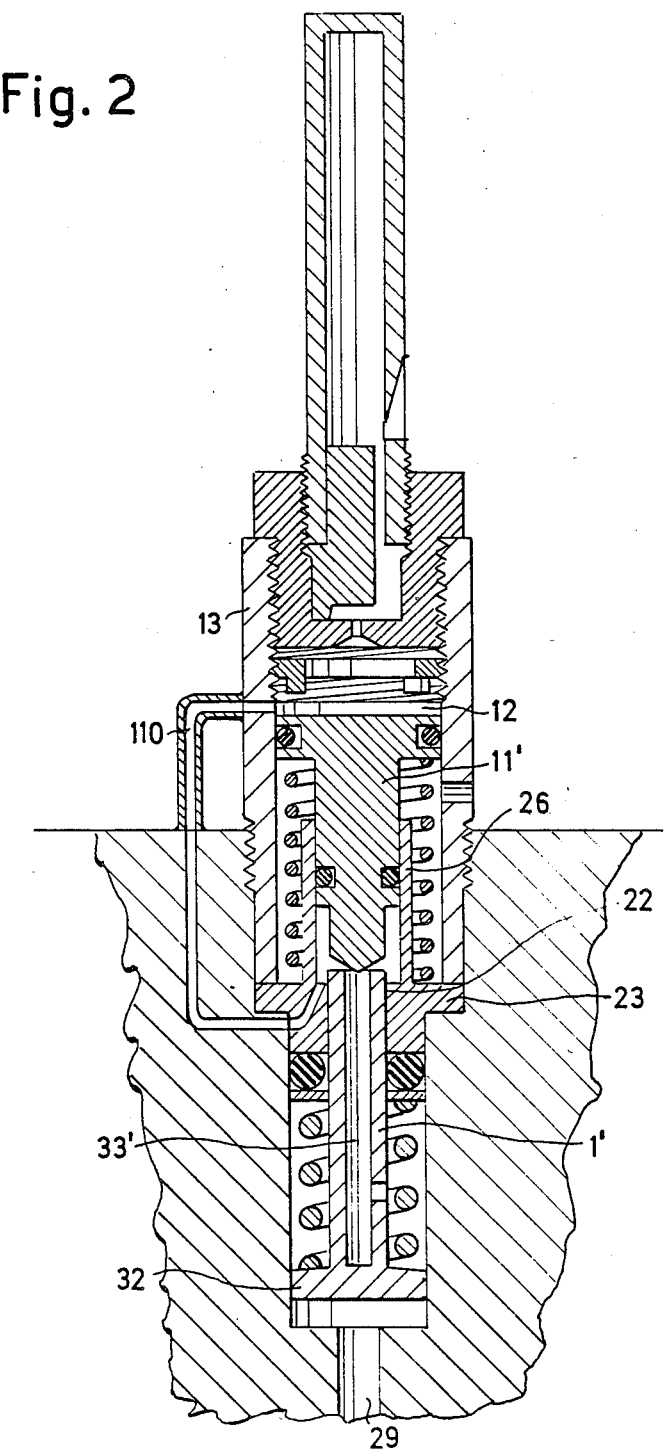
FIG. 2 shows a second modified embodiment of the regulator of FIG. 1 in cross-section.

A modified embodiment of the regulator of FIG. 1 is shown in FIG. 2. This lacks the piston 11' the channel 10 and 28. The first chamber 12 is, in this embodiment, provided, by the intermediary of an aperture in the wall 13, with a channel 110 which runs into the bottom 23 of the second chamber 4 between the first aperture 22 and the bottom of the fistular device 26. The channel 33' of the high-pressure piston 1' does not run through the entire piston in this embodiment. Gas at high pressure through the aperture 29 flows, as also in the embodiment according to FIG. 1, here past the collar 32.

Figure 3:
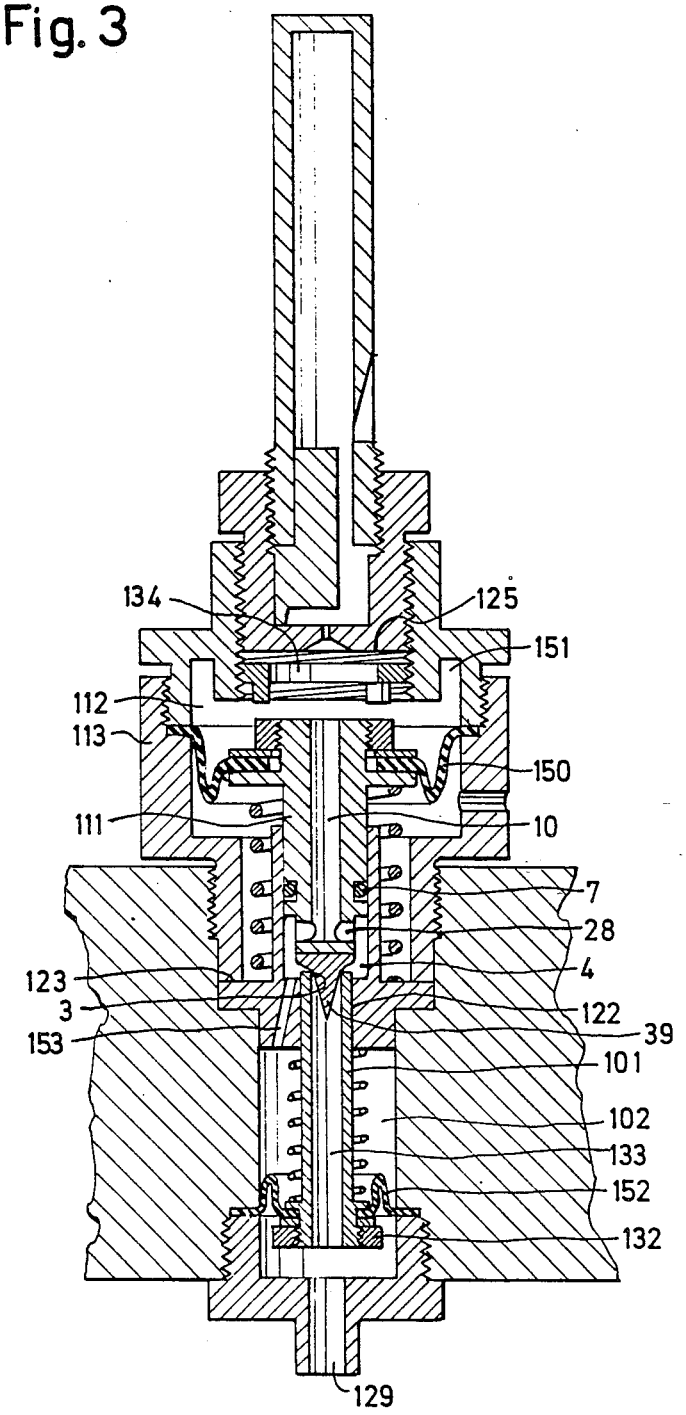
FIG. 3 shows a further embodiment of the regulator according to the present invention in cross-section.

A further embodiment of the regulator according to the present invention is shown in FIG. 3. According to this embodiment, the piston 11 has been replaced by a piston 111 whose upper region, that region turned to face the upper definition of the first chamber, has been modified. This upper region is of lesser diameter than the corresponding portion of the piston 11. The piston 111 does not slide against the casing 113, but is, by the intermediary of a diaphragm 150, which is fixedly tensioned in the upper region of the piston 111 and in the wall 113, movably connected with the casing 113. Also in this case, there is a first chamber 112 which is separated from but in fluid contact with the chamber 4 by the intermediary of the channel 10, 28.

The piston 111 differs from the piston 11 in FIG. 1 also in that the end of the piston 111 facing towards the high-pressure chamber 102 is flat. A sealing element 39 is disposed between the flat end of the piston 111 facing the high-pressure chamber 102 and the valve seat 3 of the high-pressure piston 101, this sealing element cooperating with the valve seat. Such a sealing element 39 may also be provided in the regulator according to FIG. 1, in which instance the end of the piston 11 facing the high-pressure chamber 102 is also flat, or in which the end of the piston is of a configuration corresponding to the upwardly facing side of the sealing element as shown in the Figure.

The upper defining wall of the chamber 112 displays a fixed annular outer portion 151 and a central inner portion 125, the distance between the area facing the chamber 112 being adjustable in relation to the corresponding area of the outer portion 151. Since the upper region of the piston 111 is of lesser diameter than the central inner portion 125 of the upper defining wall of the chamber 112, the piston 111 may be brought into abutment against the inner portion 125, or a specifically provided arrest 134. In the former case, the portion 125 thereby constitutes the arrest 134 for the upward movement of the first piston.

The lower portion of the regulator according to FIG. 3 is also modified, the piston 1 having been replaced by the piston 101 which, at its lower region, has a smaller collar 132 than the high-pressure piston 1. Furthermore, the lower region of the piston 101 is, by the intermediary of a diaphragm 152, in connection with the wall 121. An inlet aperture 129 discharges in the lower region of a cavity 102 beneath the diaphragm 152. The piston 101 is provided with a channel 133 which passes through the entire length of the piston 101 from the end turned to face the chamber 4, but which, instead of being a through channel, may discharge in the side wall of the piston 101 beneath the diaphragm 152.

In the first aperture 122 in the bottom 123, there are guide ridges (not shown) for the piston 101, such that gas from the chamber 4 may flow into the space defined under the bottom 123 by the piston 101, the diaphragm 152 and the wall 121. A channel 153 may possibly interconnect this space with the second chamber 4.

The regulator according to FIG. 3 operates in a manner similar to the regulator according to FIG. 1. The manner of tensioning the diaphragm 150 in the wall 113 and of tensioning the diaphragm 152 in the wall 121 and in the piston 101, as well as suitable diaphragms for this purpose, will be well-known to the skilled reader of this specification.

Naturally, it is also possible to replace the seal 7 between the first piston 111 and the inner surface of the fistular member 26 by a diaphragm as described in conjunction with FIG. 3.

FIG. 4 shows an embodiment of the regulator according to the present invention which acts according to the counter-current principle. The regulator includes a chamber 170 which is defined at the top by an upper wall 171 with an aperture 172. By such means, the chamber 170 is in communication with the ambient atmosphere. An upper portion of a first piston 211 is movable along the side wall 213 of the chamber 170. The upper portion of the piston 211 abuts against a seal 214 which seals against the wall 213. A spring member 176 is disposed between the piston 211 and wall 171, the spring member urging the piston 211 downwardly on the Drawing. The first chamber 212 is provided, in the side wall 213, with an aperture 216 to which an outlet is connected.

The bottom of the chamber 170 is provided with a central aperture 226 which corresponds to the inner surface of the fistular member 26, and a peripheral aperture 173 which connects the first chamber 212 with the second chamber 204. The bottom 223 of the second chamber 204 displays a central aperture 222 which is shown in the right-hand part of FIG. 4, through which a high-pressure piston 201 is movable. According to the left-hand portion of FIG. 4, the aperture 222 may accommodate the entire surface of the bottom 223. The high-pressure piston 201 is slidably displaceable along the surface of the aperture 222 and sealingly abuts against this surface by the intermediary of a seal 205. The high-pressure piston 201 is provided with a through-channel 233 which is of lesser diameter at the top than at the bottom. The lower end of the piston 211 is displaceable through the channel 233. The transition between the narrower and wider portions of the channel 233 in the piston 201 forms a valve seat 203.

In the second chamber 204, a spring member 217 maintains the high-pressure piston 201 in spaced-apart relationship from the upper defining wall of the chamber 204.

A sealing element 239 is disposed in the channel 233 of the piston 201, in the further portion thereof. The element 239 is lightly held by spring means 175 against the valve seat 203. An aperture 229 is provided in the bottom of the high-pressure chamber 202 for gas from a high-pressure source.

When the various parts of the regulator are in the position as shown on the Drawing and pressure increases in the high-pressure chamber 202, the piston 201 is displaced upwardly. As a result, the throttle member (203; 239) is opened and gas flows into the second chamber 204, through the channel 173, into the first chamber 212. Since the upper region of the piston 211 which is turned to face the chamber 212 is of large surface area, the first piston 211 will be displaced upwardly, a counter-directed force being exercised by the spring member 176 against the piston 211. Since the piston 211 is displaced upwardly a slightly greater distance than the piston 201 had been moved earlier, the sealing element 239 will come into abutment against the seat 203 and shut off the gas flow from the high-pressure chamber 202 to the second chamber 204. If gas is removed from the first chamber 212, the pressure therein will fall, in which event the piston 211 will be displaced downwardly and the lower region of the piston 211 will displace the sealing element 239 downwardly and out of contact with the seat 239.

Naturally, it is also possible to modify the regulator according to the present invention as shown in FIGS. 1 and 2, such that the second chamber 4 may be, for instance, U-shaped or L-shaped. In such instance, the bottom of the chamber 4 will be upwardly directed instead of being downwardly directed or laterally directed. The piston 11 will, in such cases, be articulated at three or two points, respectively. Of course, it is also conceivable to combine, by various means, the embodiments of the present invention as illustrated in FIGS. 1–3.

All spring means 6, 17, 175, 176 and 217 are preferably linear throughout their entire working range, i.e. their spring constant k is constant according to Hook's law: $F = kx$, in which F is the force which the spring exercises in linear change x. In certain applications, it may be possible to use non-linear springs.

The present invention should not be considered as restricted to that described above and shown on the Drawings, many modifications being conceivable without departing from the spirit and scope of the appended claims.

What we claim and desire to secure by Letters Patent is:

1. A pressure regulator comprising:
   a casing, a first chamber and a second chamber defined in said casing and separated by a first regulating piston movable during the pressure-regulating operation for varying the size of said chambers and a permanently open channel in said piston providing a fluid communication between said first and second chambers;
   a high-pressure chamber disposed beneath the bottom of said second chamber and connectable to a gas container;
   a first aperture extending in the bottom of said second chamber;
   a high-pressure piston disposed in said high-pressure chamber and having one end projecting into said second chamber through said first aperture and being displaceable in its longitudinal direction through said first aperture;
   a second aperture provided in said projecting end of said high-pressure piston;
   a throttle device located between said high-pressure chamber and said second chamber and including means provided in said second aperture and cooperating with said first regulating piston at a first end facing said second aperture;
   a fluid connection in said high-pressure piston between said second aperture and the outside of said high-pressure piston in said high-pressure chamber;
   a first spring member, which urges said high-pressure piston towards the bottom of said high-pressure chamber;
   a second spring member which urges said first regulating piston in the direction away from said means in said second aperture; and
   means for deactivation of said regulator provided in the upper wall of said first chamber cooperating with a second end of said first regulating piston.

2. The regulator as claimed in claim 1, wherein said means provided in said second aperture includes a valve seat.

3. The regulator as claimed in claim 2, wherein said throttle device further comprises a sealing element associated with said first regulating piston and cooperating with said valve seat.

4. The regulator as claimed in claim 1, wherein the spring constant of said first spring member is constant throughout the entire working range of the spring.

5. The regulator as claimed in claim 1, wherein the spring constant of said second spring member is constant throughout the entire working range of the spring.

6. The regulator as claimed in claim 2, wherein said means for deactivation includes an arrest member located at the upper wall of said first chamber for the displacement of said first regulating piston in a direction away from said valve seat, whereby said throttle means is brought into the closed and opened positions when the high-pressure piston brings, due to the pressure in said high-pressure chamber, said first piston into contact or out of contact with said arrest member, respectively.

7. The regulator as claimed in claim 6, wherein said arrest member is adjustable for different spacings from said second end of said first regulating piston when said first regulating piston is in its lowermost position.

8. The regulator as claimed in claim 6, wherein the upper wall of said first chamber is provided with a nozzle which is in fluid communication with a warning device.

9. The regulator as claimed in claim 8, wherein the upper wall of said first chamber is provided with a nozzle which is in fluid communication with a warning device.

10. The regulator as claimed in claim 3, wherein said first chamber further includes an arrest member provided in the upper wall of said first chamber for displacement of said first piston in a direction away from said valve seat, said arrest member being located at such a spaced-apart relationship from said second end of said first regulating piston that the highest prevailing pressure in said high-pressure chamber is incapable of displacing the high-pressure piston such a distance that said first piston arrives at said arrest.

11. The regulator as claimed in claim 10, wherein the upper wall of said first chamber is provided with a nozzle which is in fluid communication with a device driven at a constant fluid flow.

12. The regulator as claimed in claim 11, wherein said arrest member is defined by said upper wall of said first chamber.

13. The regulator as claimed in claim 6, wherein said throttle device, displays a sealing area which is selected in relation to the sealing area of said high-pressure piston and the spring constants of each respective spring members, such that the pressure in said first chamber is substantially constant, irrespective of variations in the pressure in said high-pressure chamber, within a range in which the pressure in said high-pressure chamber begins to displace said high-pressure piston in a direction towards said second chamber, until such time as said first piston has come into contact with the arrest of said first chamber.

14. The regulator as claimed in claim 6, wherein the pressure in said first chamber increases proportionally with the pressure in said high-pressure chamber.

15. The regulator as claimed in claim 6, wherein the pressure in said first chamber decreases proportionally to the pressure in said high-pressure chamber.

16. The regulator as claimed in claim 1, wherein said first regulating piston further comprises a first diaphragm which is clamped between said casing and said first regulating piston; and said high-pressure piston includes a second diaphragm which is clamped between said casing and said high-pressure piston.

17. The regulator as claimed in claim 3, wherein the spring constant of said second spring member is constant throughout the entire working range of the spring.

18. The regulator as claimed in claim 4, wherein said upper wall of said first chamber further includes an arrest member for the displacement of said first regulating piston in a direction away from said valve seat, whereby said throttle device defined by said first piston cooperating with said valve seat, is brought into the closed and opened position, respectively, when the high-pressure piston brings, by pressure in said high-pressure chamber, said first regulating piston into contact or out of contact with said arrest member.

19. The regulator as claimed in claim 2, wherein said upper wall of said first chamber further includes an arrest member for the displacement of said first regulating piston in a direction away from said valve seat, whereby said throttle device defined by said first piston cooperating with said valve seat, is brought into the closed and opened position, respectively, when the high-pressure piston brings, by pressure in said high-pressure chamber, said first piston into or out of contact with said arrest member.

20. The regulator as claimed in claim 15, wherein the upper wall of said first chamber is provided with a nozzle which is in fluid communication with a warning device.

21. The regulator as claimed in claim 5, wherein said means for deactivation includes an arrest member in the upper wall of said first chamber for displacement of said first member, said arrest member being located at such a spaced-apart relationship from said second end of said first piston that the highest prevailing pressure in said high-pressure chamber is incapable of displacing the high-pressure piston such a distance that said first piston arrives at said arrest member.

22. The regulator as claimed in claim 7, wherein said arrest member is the upper wall of said first chamber.

23. The regulator as claimed in claim 13, wherein said arrest member is the upper wall of said first chamber.

24. The regulator as claimed in claim 15, wherein said throttle device, formed by the cooperation of said seat with said first piston, displays a sealing area which is selected in relation to the sealing area of said high-pressure piston and the spring constants of each respective spring members, such that the pressure in said first chamber is substantially constant, irrespective of variations in the pressure in said high-pressure chamber, within a range in which the pressure in said high-pressure chamber begins to displace said high-pressure piston in a direction towards said second chamber, until such time as said first piston has come into contact with the arrest of said first chamber.

25. The regulator as claimed in claim 13, wherein said first regulating piston further comprises a first diaphragm which is clamped between said casing and said first regulating piston; and said high-pressure piston includes a second diaphragm which is clamped between said casing and said high-pressure piston.

26. The regulator as claimed in claim 14, wherein said first regulating piston further comprises a first diaphragm which is clamped between said casing and said first piston and said high-pressure piston includes a second diaphragm which is placed under tension between said casing and said high-pressure piston.

27. The regulator as claimed in claim 3, wherein said first regulating piston further comprises a first diaphragm which is clamped between said casing and said first regulating piston; and said high-pressure piston includes a second diaphragm which is clamped between said casing and said high-pressure piston.

28. The regulator as claimed in claim 7, wherein said first regulating piston further comprises a first diaphragm which is clamped between said casing and said first regulating piston; and said high-pressure piston includes a second diaphragm which is clamped between said casing and said high-pressure piston.

29. The regulator as claimed in claim 6, wherein said arrest member is adjustable for different spacings from said second end of said first piston when said first piston is in its lowermost position.

* * * * *